Oct. 29, 1963

A. H. BOBECK 3,109,161

ELECTRICAL SELECTION CIRCUITS

Filed Dec. 3, 1958

INVENTOR
A. H. BOBECK
BY William H. Kamstra
ATTORNEY

United States Patent Office 3,109,161
Patented Oct. 29, 1963

3,109,161

ELECTRICAL SELECTION CIRCUITS

Andrew H. Bobeck, Chatham, N.J., assignor to Bell Telephone Laboratories, Incorporated, New York, N.Y., a corporation of New York Filed Dec. 3, 1958, Ser. No. 777,943
7 Claims. (Cl. 340—166)

This invention relates to electrical switching circuits and more particularly to access switching circuits for large scale magnetic memory arrays.

Memory arrays having the capacity to store large amounts of information play an important and necessary role in computers and information handling systems generally. Thus, for example, memory arrays employing some form of magnetic memory element as a basic storage cell capable of storing in the order of two million information bits are well known. In such memory arrays in which the information addresses are functionally arranged on a coordinate basis, access to a particular information address or addresses for writing and interrogation purposes is generally had by applying coincident energizing currents to coordinate conductors defining the address or addresses to be reached. Whether such access is to be random or sequential or whether the memory is word or bit organized, it is obvious that the circuitry required to provide the properly timed current pulses to accomplish the particular writing or interrogation function can be both costly and complex.

The memory array itself, particularly if it is of the character employing toroidal magnetic cores as basic storage cells, can also be costly from the viewpoint of its constituents and fabrication. However, recent advances both in the composition and structural form and the fabrication techniques employed, have made possible considerable savings, and as a result, the cost of even very large scale memories has been substantially reduced. Thus, for example, the use of magnetic wire elements of the type described in a copending application of the present inventor, Serial No. 675,522, filed August 1, 1957, now Patent 3,083,353, issued March 26, 1963, makes possible a simplification in memory construction not theretofore available. Such simplification and saving, although operating advantageously to the memory array itself, however, also introduce a disparity between the cost of the memory array and the access circuitry necessary for the write and interrogation cycles of operation. Further, any real advance in reliability can best be achieved only if a simplification in the memory array proper is accompanied by a simplification in the associated access circuitry. Any simplification, however, must bear in mind the large variation in possible impedance values which may be presented to the access circuitry of, for example, a magnetic core array. Thus, in a word-organized memory array constant current driving sources for the cores are necessary since any predetermined number of the cores containing a word may be driven. Because of this and other considerations known improvements in memory access circuits have come short of achieving the full goal of simplicity, economy, and reliability.

Accordingly, it is an object of this invention to simplify the access circuitry for large scale information memory arrays.

Another object of this invention is the selective application of energizing currents to a plurality of loads.

It is an object of this invention to provide a new and novel switching network capable of isolating and applying an energizing current to one of a plurality of loads.

It is also an object of this invention to provide a new and novel crosspoint switching network.

A further object of this invention is to make possible an access switch employing only magnetic elements therein.

Yet another object of this invention is to reduce the size, number of components, and hence the cost of selective switching networks.

The foregoing and other objects of this invention are realized in one specific illustrative embodiment thereof comprising a first and a second group of terminals. Each terminal of one group is connected to every terminal of the other group by means of a conducting path including a magnetic switching element and a load. To provide a memory access circuit in accordance with one of the aforementioned objects, the load may advantageously comprise a memory element or a row of memory elements of a memory array. As a result of the conducting paths so described, a symmetrical network of connections between the two groups of terminals is realized. That is, for each terminal of one group and any terminal of the other group, one direct path and an equal number of parallel electrical paths may be traced. In order to select one of the direct paths, and therefore its included load, a potential pulse is applied to its terminals. Currents will be caused to flow in all of the paths traceable between the two selected terminals, the values being determined by the impedances of the paths. As will be demonstrated in detail hereinafter, because of the relative impedances of the direct path including the selected load and the aggregate of the remaining available paths, the selected direct path will have a potential V applied across its terminals while any other path connecting the selected terminals has a potential of the order $V/2$ applied across it.

As a result of the increased current present in the selected direct path, the magnetic element included in that path, which may comprise a conventional magnetic core capable of being switched from one state of magnetic saturation to another, will switch its state first. A final current as determined by the resistance of the selected path will flow, which current will continue until the magnetic elements in the other paths begin to switch. A large value current pulse is thus first applied to the load of the selected path which current has a duration measured by the time at which the magnetic element in the selected path switches and the time at which the remaining magnetic elements begin to switch. At the latter time the potential pulse applied to the terminals of the selected path is also terminated.

Advantageously, in accordance with the above principles, a memory access switch in which only magnetic elements are employed is readily achieved. Thus, both the magnetic switching elements and the memory elements comprising the loads to be energized included in the connecting paths between the terminal pairs may comprise wire memory elements of the character described in the copending application hereinbefore cited. Such wire elements comprise magnetic wires in which a preferred helical flux path has been established by subjecting the wire to a torsional stress, for example. The wire thus, besides itself constituting the memory element, may also constitute one of its energizing conductors.

A feature of this invention accordingly is a switching network in which both the loads to be energized and the current control elements together with the electrical conductors are of a magnetic material.

Another feature of this invention is a parallel network of current paths in which the current through any one selected path is controlled by the switching of the magnetic state of a magnetic element in the selected path and the impedances of the other paths.

Still another feature of this invention is a parallel network of conducting paths each including a load and arranged so that any selected path will always present a lower impedance than any other path upon the application of an excitation pulse.

It is yet another feature of this invention that a magnetic switching element be connected in series with a load for regulating the impedance of the load circuit upon the application of a switching current.

The foregoing and other objects and features of this invention will be better understood from a consideration of the detailed description of the illustrative embodiment thereof which follows when taken in conjunction with the accompanying drawings, in which.

Figure 1:
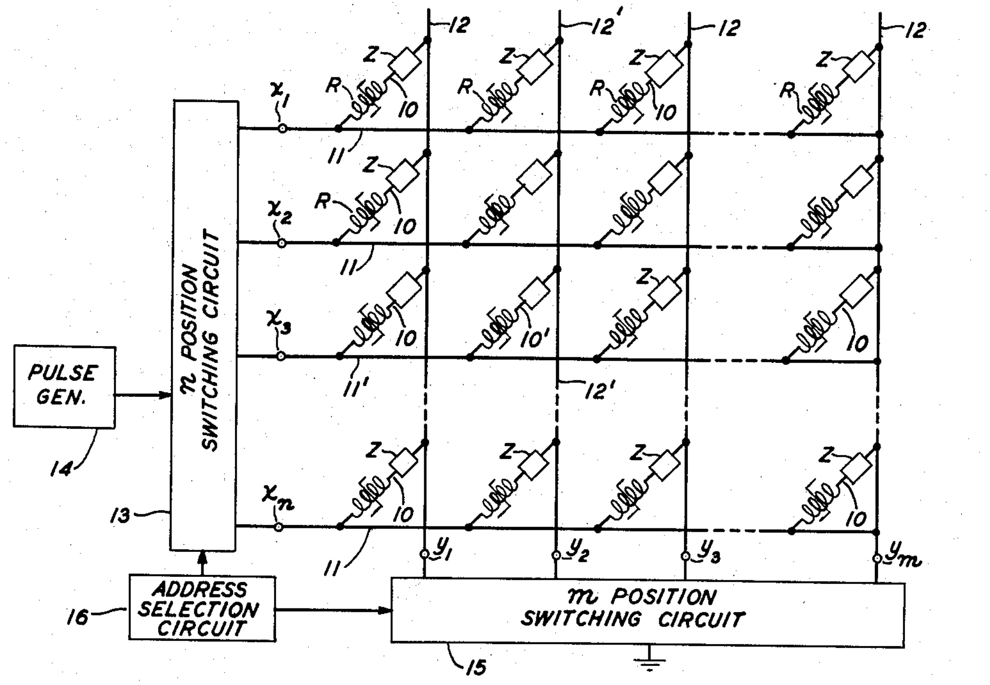
FIG. 1 is a schematic representation of a switching network in accordance with one specific embodiment of this invention arranged for simplification in a crosspoint array.

The illustrative embodiment of the principles of this invention shown in FIG. 1 provides for the establishing of a conducting path between any selected one of the terminals $x_1, x_2, x_3 \ldots x_n$, and a selected one of the terminals $y_1, y_2, y_3 \ldots y_m$. The available conducting paths between the $x$ and $y$ terminals are most conveniently shown as arranged in matrix fashion. However, it is noted that, in accordance with a contemplated application of this invention, each of the conducting paths in turn may constitute a row or a column of a memory matrix of which the embodiment being described comprises the access circuitry. Each of the available direct conducting paths connecting the $x$ and $y$ terminals is completed by a corsspoint link 10 which link contains the load to be energized by this invention. Although in the present embodiment this load is contemplated to comprise the impedance of a row or column of a magnetic memory matrix, the loads to be energized my obviously constitute any impedance which is responsive to an applied potential. Accordingly, for purposes of description, the impedances of the memory matrix rows or columns are represented generally in block forms designated simply as Z. In addition to a load Z, each of the links 10 includes therein a saturable reactor element R. The latter may comprise a conventional toroidal magnetic core or it may advantageously comprise a magnetic wire element of the character described in the copending application previously cited herein. Although the reactor elements R may be of materials exhibiting substantially rectangular hysteresis characteristics, a nonlinearity in hysteresis loop characteristics is sufficient for purposes of this invention.

Each of the links 10 is connected between a horizontal common conductor 11 connected to a terminal $x$ and a vertical common coductor 12 connected to a terminal $y$. Thus, each of the conductors 11 is connected to every conductor 12 and vice versa, by a link 10. As a result, a single direct conducting path and a plurality of parallel conducting paths may be traced from each of the terminals $x$ to every terminal $y$ and also from each of the terminals $y$ to every terminal $x$.

Also connected to the terminals $x_1$ through $x_n$ is an $n$ position switching circuit 13 to which in turn is connected a voltage pulse generator 14. Connected to the terminals $y_1$ through $y_m$ is an $m$ position switching circuit 15. The circuits 13 and 15 are simultaneously controlled by an address selection circuit 16. The $n$ and $m$ position switching circuits 13 and 15 may be of any type well known in the art capable of selectively opening and closing energizing paths to the terminals $x$ and $y$, respectively, under the control of external address selection circuitry. The pulse generator 14 and address selection circuit 16 are also circuits known to one skilled in the art and accordingly need not be described in detail herein except to the extent of the control functions performed.

Figure 2:
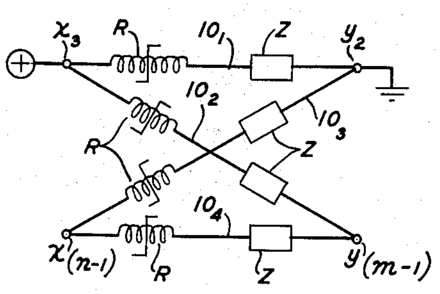
FIG. 2 is a simplified diagram illustrating the principles of this invention.

Returning now to a consideration of the possible conducting paths which may be traced from any terminal $x$ to each of the terminals $y$ and vice versa, it is noted that $mn$ number of direct conducting paths, each including a single link 10, exist between the terminals $x$ and $y$. It may be assumed for purposes of description that the $n$ position circuit 13 and the $m$ position circuit 15 have completed energizing paths between the pulse generator 14 and ground to the terminals $x_3$ and $y_2$, respectively. A direct conducting path may accordingly be traced between the latter terminals via the common horizontal conductor 11', link 10', and common vertical conductor 12'. This conducting path is shown in FIG. 2 simply as the link $\mathbf{10}_1$ connected between the energized terminal $x_3$ and the grounded terminal $y_2$ without interconnecting conductors 11' and 12'. It is evident from an inspection of FIG. 1 that the terminal $x_3$ is also electrically connected to the remaining terminals $y_1, y_3 \ldots$ and $y_m$ by direct conducting paths each including a single link 10. Obviously there will be $(m-1)$ of such direct paths and these are represented in FIG. 2 as a single link $\mathbf{10}_2$ connected between the terminal $x_3$ and a terminal $y_{(m-1)}$. In a similar manner $(n-1)$ direct conducting paths, each including a link 10, will electrically connect the terminal $y_2$ with the remaining terminals $x_1, x_3 \ldots$ and $x_n$. These are represented in FIG. 2 as a single link $\mathbf{10}_3$ connected between the terminals $y_2$ and $x_{(n-1)}$. Thus, in addition to the direct paths including the link $\mathbf{10}_1$ connected between the terminals $x_3$ and $y_2$, $(m-1)$ direct paths also connect the terminal $x_3$ to the remaining terminals $y$. Conversely, also in addition to the direct path including the link $\mathbf{10}_1$ connected between the terminals $y_2$ and $x_3$, $(n-1)$ direct paths also connect the terminal $y_2$ to the remaining terminals $x$. Thus, referring to FIG. 2, at this point one direct link $\mathbf{10}_1$, $(m-1)$ links $\mathbf{10}_2$, and $(n-1)$ links $\mathbf{10}_3$ have been described as originating at the terminals $x_3$ and $y_2$. Since in this embodiment, the network thus presented is symmetrical, that is, one in which $m=n$, $n$ may be substituted for $m$ in the foregoing expressions. The total number of $\mathbf{10}_2$ and $\mathbf{10}_3$ links accordingly becomes $2(n-1)$.

However, in addition to the foregoing paths originating at the terminals $x_3$ and $y_2$, other paths connecting the terminals $x$ and $y$ exist. These may be traced in a manner identical to that employed for the immediately foregoing from each of the remaining terminals $x_1, x_2 \ldots$ and $x_n$ and $y_1, y_3 \ldots$ and $y_m$. Since $(n-1)$ such terminals remain in each group and since the number of conducting paths for each is $(n-1)$ as demonstrated above, $(n-1)^2$ conducting paths remain to complete the tracing of all of the possible paths between the terminals $x$ and $y$. The latter paths are represented in FIG. 2 by a single link $\mathbf{10}_4$ connected between the terminals $x_{(n-1)}$ and $y_{(m-1)}$.

To recapitulate, the number of possible direct conducting paths between the terminals $x$ and $y$, each of which includes a single link 10, is given by the expression $$1+2(n-1)+(n-1)^2$$

This expression is simplified to give the value $n^2$ as the number of such direct paths, which would be expected from an inspection of the matrix arrangement of FIG. 1. Each of the terminals $x$, in addition to being connected to every terminal $y$ by a direct conducting path as described, is also electrically connected to the other $x$ terminals by indirect conducting paths as is also evident from an inspection of FIG. 1. This is similarly the case with respect to the terminals $y$.

With the foregoing detailed consideration of the possible conducting paths available between the terminals $x$ and $y$, the manner in which a selected one of the direct paths is isolated may be described. If $n$ is assumed to be large, then the total impedance represented by the $(n-1)^2$ parallel conducting paths will be trivial and the terminals $x$ and $y$ represented in FIG. 2 by the terminals $x_{(n-1)}$ and $y_{(m-1)}$ may be considered effectively at the same potential. The $(n-1)^2$ conducting paths represented in FIG. 2 by the link $\mathbf{10}_4$ may accordingly for practical purposes be understood as shorted by the remaining conducting paths of the network. This leaves the $2_{(n-1)}$ conducting paths represented in FIG. 2 by the links $\mathbf{10}_2$ and $\mathbf{10}_3$ and the selected path represented by the link $\mathbf{10}_1$. In a network such as has been described, if each of the links 10 is purely resistive, it has been found that when a positive voltage V is applied across the assumed selected terminals $x_3$ and $y_2$ from the generator 14, a voltage of the order $V/2$ is applied across each of the other terminal pairs. The same substantial relationship holds for the currents flowing in the respective conducting paths. For many applications the discrimination represented by these current values would be acceptable. However, for some applications the current required by the driving generator 14 becomes relatively large.

In accordance with another aspect of this invention, each of the links 10 has included therein a saturable reactor element R in series with the load Z as previously stated. The impedance presented by a reactor element R is determined as relatively high as compared with that of a load Z. Assume a normal condition in which all of the reactor elements R are of the square loop type and are in a particular set remanent magnetic condition depending upon the direction of the current to be applied to the loads Z. When the higher positive voltage V from the generator 14 then appears across a selected conducting path, the reactor element R in that path will, as a result, be driven to magnetic saturation in the opposite direction before the elements R of the links 10 of the unselected paths can complete such a flux excursion.

Figure 3:
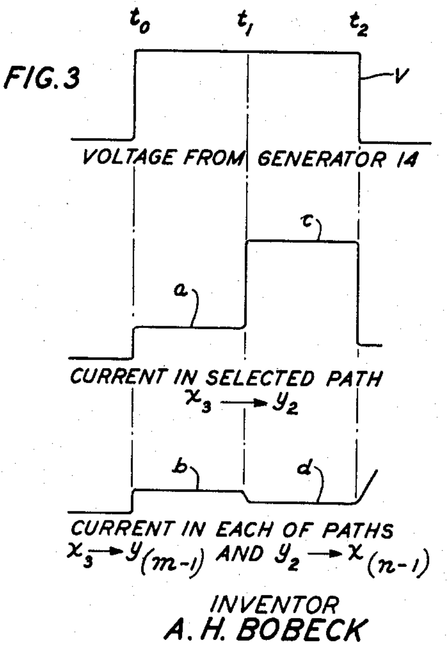
FIG. 3 is a chart comparing current values at various operational stages of this invention.

In FIG. 3 is shown a comparison of the voltage from the generator 14, current in the selected path between the terminals $x_3$ and $y_2$, and the current in each of the unselected paths designated in FIG. 2 as between the terminals $x_3$ and $y_{(m-1)}$ and the terminals $y_2$ and $x_{(n-1)}$. At the time $t_0$ the circuit from the voltage pulse generator 14 to ground via the terminals $x_3$ and $y_2$ may be assumed to be established. At this time as a result of the positive voltage pulse V from the generator 14 the reactor elements R in each of the paths, both selected and unselected, will begin to move to saturation in the opposite direction and a small current will flow in each one of the paths. This current is designated $a$ and $b$ for the selected path and the unselected paths, respectively. In accordance with the principles of this invention previously described, the current $a$ would, under purely resistive conditions, be of the order of twice that of the current $b$. However, since all of the reactor elements R are beginning to move to opposite saturation, the current $a$ is only somewhat larger than $b$.

Because of the greater positive voltage appearing across the selected path, the element R of that path will be saturated first, which is represented as at the time $t_1$ in FIG. 3. The reactor elements R of the unselected paths will complete flux excursions to saturation some time later at time $t_2$. Between the times $t_1$ and $t_2$ a large current, represented in FIG. 3 as $c$, will flow in the selected path and will be applied to a load Z which comprises, for example, a row of a magnetic memory matrix. During this same interval the current in the unselected paths falls accordingly as represented by the wave form $d$ in FIG. 3. The latter current will begin to increase as the elements R of the unselected paths complete the saturation; however, substantially at the time $t_2$ the positive voltage pulse V applied from the generator 14 terminates thereby effectively preventing the complete saturation of any but the reactor element R in the selected path. The magnitude of the current $c$ flowing in the selected path will be determined by the resistance in that path and the ratio of the magnitudes $c$ and $d$ will be determined by the ratio of that resistance to the reactor element R impedance of the unselected paths. In one embodiment of this invention such ratios in the order 100:1, for example, have been found obtainable.

Where materials exhibiting substantially rectangular hysteresis characteristics are employed for the saturable reactor elements R a means for resetting the magnetic condition of the elements R may become advantageous. In such a case, a succeeding negative voltage pulse from the pulse generator 14 applied to the terminal $x_3$ will repeat the process described above, with the currents in the selected and unselected paths now flowing in the opposite direction. Square loop reactor elements R will as a result be reset and the access switch will be restored to its normal magnetic condition. Should such a negative reset current be undesirable in the loads Z at this operative stage, suitable by-pass or isolating circuit arrangements not shown in the drawing may be devised by one skilled in the art. Obviously, where the reactor elements R present only negligible remanence such a resetting means would be unnecessary to restore the magnetic condition of the elements R.

The duration of the load current pulse $c$ represented in FIG. 3 may be extended by substituting a current pulse generator for the voltage pulse generator 14. The voltage effectively available for reversing the saturation condition of the reactor elements R in the unselected paths may in this manner be reduced once the element R in the selected path has so reversed and load current flows.

What has been described is considered to be only an illustrative embodiment of the present invention. It is therefore to be understood that various and numerous other arrangements may be devised by one skilled in the art without departing from the spirit and scope thereof.

What is claimed is:

1. An electrical selection switch comprising a first plurality of terminals, a second plurality of terminals, a plurality of conducting paths interconnecting said first and second plurality of terminals, said plurality of paths including a single direct path connecting a particular first terminal of said first plurality of terminals with a particular second terminal of said second plurality of terminals and a plurality of indirect paths also connecting said particular first terminal with said particular second terminal, first saturable reactor means and a load means in said direct path, the impedance of said first reactor means, when unsaturated, being relatively greater than the impedance of said load means, second saturable reactor means in each of said indirect paths, the impedance of said first reactor means being less than the aggregate impedance of said second reactor means to potentials applied to said first and second terminals, and pulse generating means for applying potentials to said first and second terminals of a duration to drive only said first saturable reactor means to saturation.

2. An electrical circuit comprising a plurality of load means, a plurality of magnetically saturable elements, each of said saturable elements having, when unsaturated, an impedance substantially greater than that of any of said load means, a plurality of windings inductively coupled respectively to said plurality of saturable elements, one side of each of said windings being connected to one side of a respective one of said load means, the other side of particular groups of said windings being connected to common first terminals, the other side of particular groups of said load means being connected to common second terminals, each winding of each of said particular groups of windings being connected to a load means of a different one of said particular groups of load means, pulse generating means for applying a first potential to a selected one of said first terminals, and pulse generating means for applying a second potential to a selected one of said second terminals, said first and second potentials being of a duration to drive to saturation only a selected one of said saturable elements.

3. An electrical selection switch comprising a first plurality of $m$ terminals, a second plurality of $n$ terminals, a conducting network connecting said first plurality of terminals with said second plurality of terminals including a first conducting path connecting a first terminal of said first plurality of terminals with a second terminal of said second plurality of terminals, a first group of $(n-1)$ conducting paths connecting said first terminal with the remaining terminals of said second plurality of terminals, a second group of $(m-1)$ conducting paths connecting said second terminal with the remaining terminals of said first plurality of terminals, a third group of $(n-1)(m-1)$ conducting paths connecting each of the remaining terminals of said first plurality of terminals with each of the remaining terminals of said second plurality of terminals, each of said conducting paths including a saturable reactor means and a load means, said reactor means having, when unsaturated, an impedance substantially greater than that of said load means, and pulse generating means for applying a first potential to said first terminal and a second potential to said second terminal, said potentials being of a duration to drive to saturation the saturable reactor of only said first conducting path.

4. An electrical switching circuit comprising a first plurality of terminals, a second plurality of terminals, an electrical network interconnecting said first and second plurality of terminals comprising a plurality of electrical conducting paths extending from each terminal of said first plurality of terminals to each terminal of said second plurality of terminals and from each terminal of said second plurality of terminals to each terminal of said first plurality of terminals, a saturable reactor means connected in each of said plurality of conducting paths, and a load means connected in and common to one of said electrical conducting paths extending between a first terminal of said first plurality of terminals and a second terminal of said second plurality of terminals, each of said reactor means having, when unsaturated, an impedance substantially greater than that of said load means, and pulse generating means for applying a first potential to said first terminal and a second potential to said second terminal, said potentials being of a duration to drive to saturation the saturable reactor means in only said one conducting path.

5. An electrical selection circuit comprising a first plurality of $x$ coordinate conductors, a second plurality of $y$ coordinate conductors, a plurality of conducting links connecting each of said $x$ coordinate conductors to each of said $y$ coordinate conductors, each of said conducting links including a saturable reactor means and a load means, said reactor means having, when unsaturated, an impedance relatively greater than that of said load means, and means for energizing a particular one of said load means comprising pulse generating means for applying a first potential to the $x$ coordinate conductor connected to one side of the connecting link including said particular one of said load means, and pulse generating means for applying a second potential to the $y$ coordinate conductor connected to the other side of said last-mentioned connecting link, said first and second potentials being of a duration to drive to saturation the saturable reactor means in only the one of said conducting links including said particular load means.

6. An electrical selection switch comprising a first plurality of terminals, a second plurality of terminals, a plurality of conducting paths for connecting each of said first plurality of terminals with each of said second plurality of terminals, saturable reactor means and bilateral load means connected in each of said conducting paths, said reactor means having, when unsaturated, an impedance relatively greater than that of said load means, and pulse generating means for applying a first potential to one of said first plurality of terminals and a second potential to one of said second plurality of terminals, said potentials being of a duration to drive the saturable reactor means of only a selected one of said conducting paths to its saturated condition thereby causing a substantially greater current to flow to said selected path than in the remaining ones of said plurality of conducting paths.

7. An electrical selection switch comprising a first plurality of terminals, a second plurality of terminals, a plurality of conducting paths for connecting each of said first plurality of terminals with each of said second plurality of terminals, saturable reactor means having nonlinear hysteresis characteristics and a load means connected in each of said conducting paths, said reactor means having, when unsaturated, an impedance relatively greater than that of said load means, and pulse generating means for applying a first and second potential to a particular one of said first plurality of terminals and to a particular one of said second plurality of terminals, respectively, of a duration related to the hysteresis characteristics of said saturable reactor means such that only the saturable reactor means included in the conducting path connecting said particular terminals is driven to saturation by said first and second potentials.

References Cited in the file of this patent

UNITED STATES PATENTS

| | | |
|---|---|---|
| 1,796,030 | Kell | Mar. 10, 1931 |
| 2,375,609 | Zuhlke | May 8, 1945 |
| 2,739,300 | Haynes | Mar. 20, 1956 |
| 2,740,949 | Counihan et al. | Apr. 3, 1956 |
| 2,773,444 | Whitney | Dec. 11, 1956 |
| 2,889,508 | McCoy | June 2, 1959 |
| 2,931,015 | Bonn et al. | Mar. 29, 1960 |
| 2,931,016 | Bonn et al. | Mar. 29, 1960 |
| 2,960,682 | French | Nov. 15, 1960 |

FOREIGN PATENTS

| | | |
|---|---|---|
| 769,384 | Great Britain | Mar. 6, 1957 |
| 1,145,509 | France | Oct. 28, 1957 |

OTHER REFERENCES

Proceedings of Association of Computing Machinery, May 2–3, 1952, pp. 207–212 (by A. Wang). (Photocopy in 340–174*c*.)